United States Patent
Stuedemann

(10) Patent No.: US 11,104,249 B2
(45) Date of Patent: Aug. 31, 2021

(54) SEAT AND A RELEASE AND SLIDE ASSEMBLY FOR A SEAT

(71) Applicant: Richard T Stuedemann, Ortonville, MI (US)

(72) Inventor: Richard T Stuedemann, Ortonville, MI (US)

(73) Assignee: FCA US LLC, Auburn Hills, MI (US)

(*) Notice: Subject to any disclaimer, the term of this patent is extended or adjusted under 35 U.S.C. 154(b) by 116 days.

(21) Appl. No.: 16/417,120

(22) Filed: May 20, 2019

(65) Prior Publication Data

US 2020/0369181 A1    Nov. 26, 2020

(51) Int. Cl.
| | |
|---|---|
| *B60N 2/06* | (2006.01) |
| *B60N 2/08* | (2006.01) |
| *F16H 25/20* | (2006.01) |
| *F16H 25/24* | (2006.01) |
| *B60N 2/02* | (2006.01) |
| *B60N 2/20* | (2006.01) |

(52) U.S. Cl.
CPC .......... *B60N 2/067* (2013.01); *B60N 2/0881* (2013.01); *F16H 25/2056* (2013.01); *F16H 25/2454* (2013.01); *B60N 2/0232* (2013.01); *B60N 2/20* (2013.01); *F16H 2025/204* (2013.01)

(58) Field of Classification Search
CPC ........ B60N 2/067; B60N 2/0881; B60N 2/06; B60N 2/12; B60N 2/2209; B60N 2/20; F16H 25/2056; F16H 25/2454
See application file for complete search history.

(56) References Cited

U.S. PATENT DOCUMENTS

| | | | |
|---|---|---|---|
| 5,516,071 A | 5/1996 | Miyauchi | |
| 8,226,063 B2* | 7/2012 | Weber | B60N 2/0705 248/429 |
| 9,415,705 B2 | 8/2016 | Mixon et al. | |
| 9,586,500 B2* | 3/2017 | Shimizu | B60N 2/682 |
| 10,144,310 B1* | 12/2018 | Ferenc | B60N 2/067 |
| 2005/0082890 A1* | 4/2005 | Taubmann | B60N 2/929 297/344.1 |
| 2009/0000424 A1* | 1/2009 | Taubmann | E05F 11/405 74/830 |
| 2014/0123783 A1* | 5/2014 | Geiges | B60N 2/067 74/25 |
| 2014/0123788 A1* | 5/2014 | Geiges | B60N 2/067 74/89 |
| 2016/0059740 A1* | 3/2016 | Shimizu | B60N 2/075 248/429 |
| 2017/0174103 A1* | 6/2017 | Runde | B60N 2/0232 |
| 2017/0197524 A1* | 7/2017 | Runde | B60N 2/0232 |
| 2020/0282870 A1* | 9/2020 | Hsi | B60N 2/067 |

* cited by examiner

*Primary Examiner* — Christopher Garft
(74) *Attorney, Agent, or Firm* — Ralph E. Smith

(57) ABSTRACT

An assembly for a vehicle seat includes a seat track including a mount, a lead screw carried by the mount, a drive nut rotatable relative to the lead screw to move axially along the lead screw when the drive nut is rotated relative to the lead screw, a slide coupled to the drive nut for movement with the drive nut, and a retainer. The retainer has a lock member that is movable relative to the lead screw, the lock member has a first position in which the lock member engages and prevents axial movement of at least part of the lead screw and a second position in which the lock member permits axial movement of at least part of the lead screw.

8 Claims, 7 Drawing Sheets

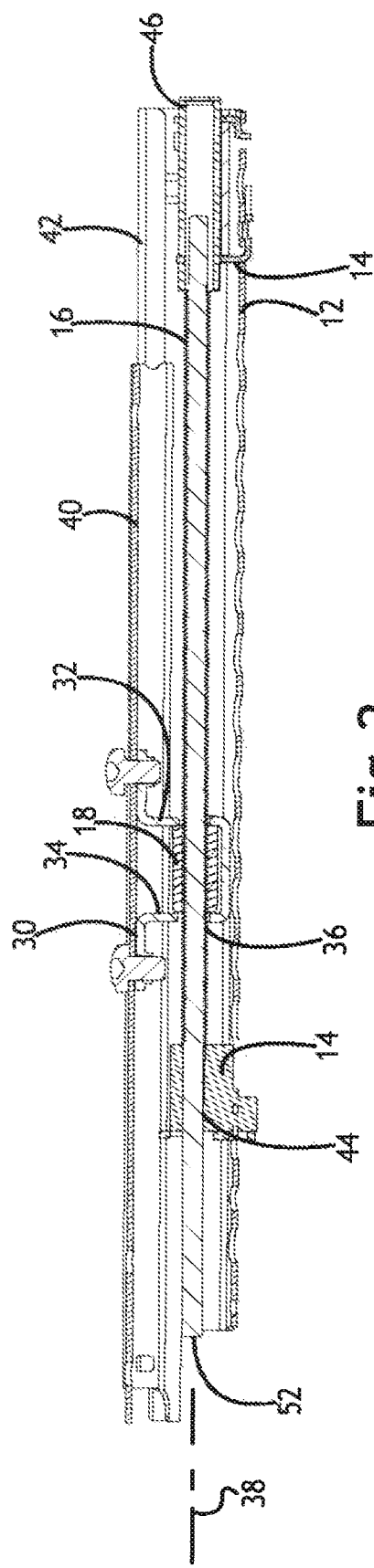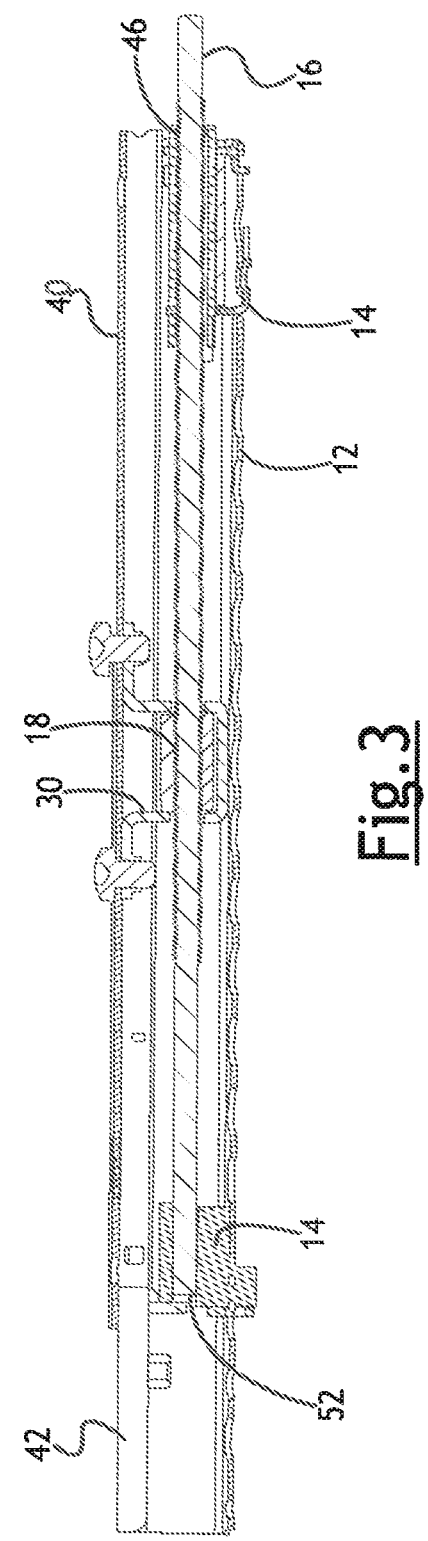

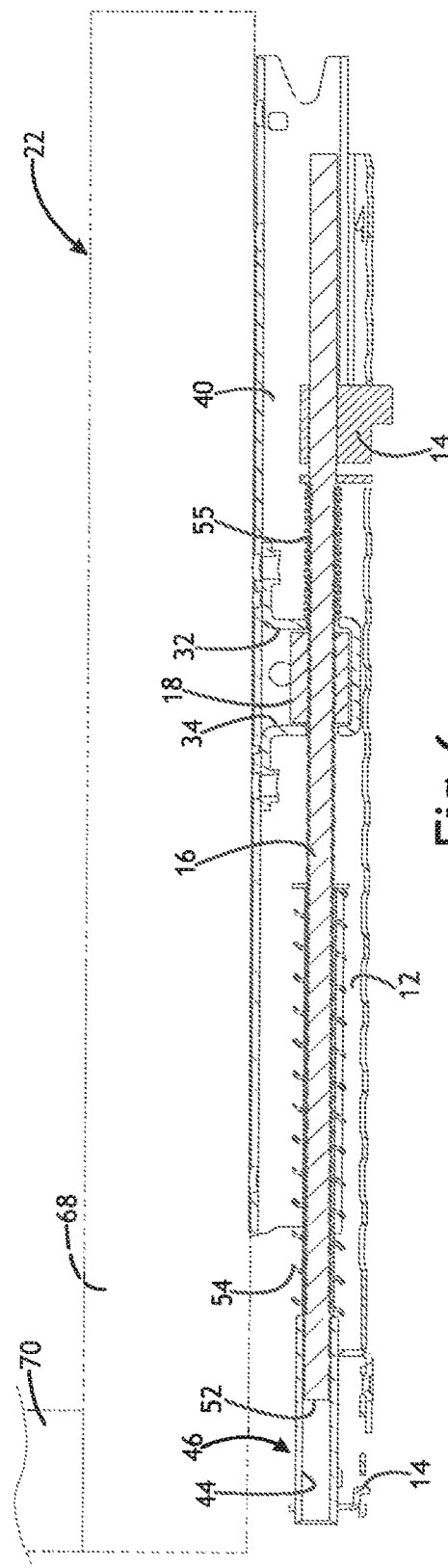
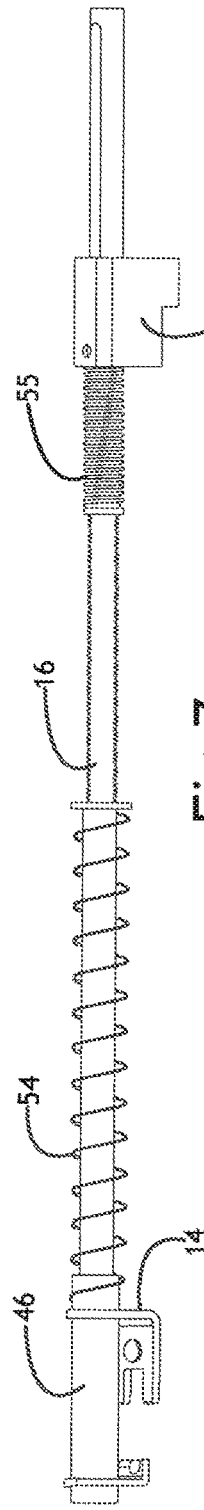
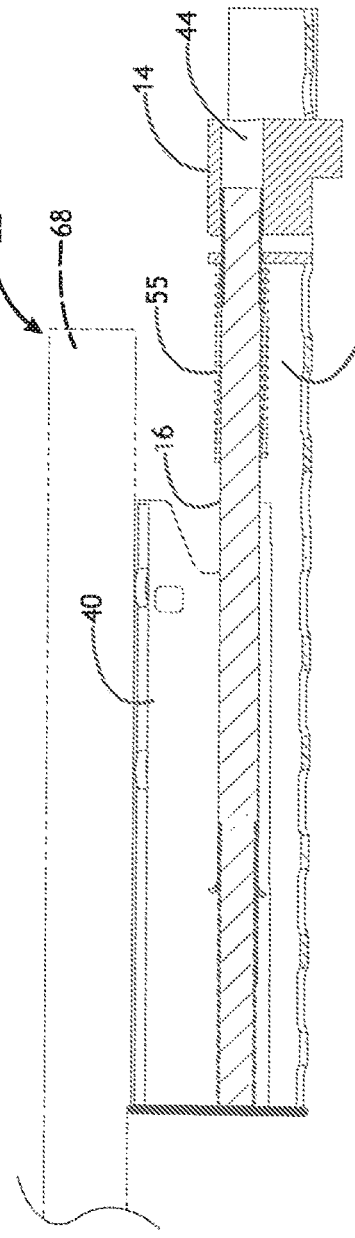
Fig.6
Fig.7
Fig.8

SEAT AND A RELEASE AND SLIDE ASSEMBLY FOR A SEAT

FIELD

The present disclosure relates to a vehicle seat having an assembly to permit movement of the seat independently of a powered actuator.

BACKGROUND

Vehicle seats may be mounted on a track that permits fore-aft movement of the seat along the track, and with a reclining mechanism that allows the seat back to pivot relative to a seat base. These seats may also be provided with one or more electrically powered actuators that drive the seat along the track, and may pivot the seat back. The actuators may reliably but somewhat slowly move the seat within the vehicle, and there are situations wherein it may be desirable to move the seat without actuating the powered actuator.

SUMMARY

In at least some implementations, an assembly for a vehicle seat includes a seat track including a mount, a lead screw carried by the mount, a drive nut threadedly engaged with the lead screw and rotatable relative to the lead screw about an axis, the drive nut moves in a first axial direction along the lead screw when the drive nut is rotated about the axis in first direction and the drive nut moves in a second axial direction along the lead screw when the drive nut is rotated in a second direction, a slide coupled to the drive nut for movement with the drive nut, and a retainer. The retainer has a lock member that is movable relative to the lead screw, the lock member has a first position in which the lock member engages and prevents axial movement of at least part of the lead screw and a second position in which the lock member permits axial movement of at least part of the lead screw.

In at least some implementations, the lead screw includes a stop surface and the lock member engages the stop surface in the first position and does not engage the stop surface in the second position. The stop surface may be at least partially defined by a void. The lead screw may include or be coupled to at least one telescopic section to permit the length of the lead screw to change as at least part of the lead screw moves relative to the mount.

In at least some implementations, the mount includes an opening through which the lead screw is received, and the lead screw is arranged for slidable movement relative to the mount when the retainer is in the second position. The assembly may include a second mount and wherein the two mounts are spaced apart, and wherein the lead screw is longer than the distance between the mounts. The lead screw may include a telescopic section having an extended state in which the lead screw has a first length and a retracted state in which the lead screw has a second length that is less than the first length, and wherein the first length is greater than the distance between the mounts. The mount may be fixed to the seat track. The retainer may be connected to the mount. In at least some implementations, the mount supports the lead screw in all positions of the lead screw.

In at least some implementations, the retainer includes a drive member that moves the lock member between the first position and second position of the lock member. A biasing member may yieldably bias the lock member to its first position.

The assembly may include a seat coupled to the slide so that the seat moves with the slide relative to the seat track. The slide may be coupled to the drive nut by a power transmission member including a bracket having a first wall and a second wall, and the drive nut may be received between the first wall and the second wall.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 2 is a sectional view showing certain components of one side of the assembly of FIG. 1 along with a slide and support, and showing a lead screw in a first position;

FIG. 3 is a sectional view like FIG. 2 and showing the lead screw in a second position;

FIG. 6 is a sectional view similar to FIG. 3 and showing a support sleeve associated with a rearward mount rather than a forward mount as shown in FIG. 3, with the lead screw in its second position;

FIG. 7 is a perspective view of the assembly of FIG. 6;

FIG. 8 is a fragmentary sectional view of the assembly of FIG. 6 illustrating the lead screw returned to its first position;

DETAILED DESCRIPTION

Figure 1:
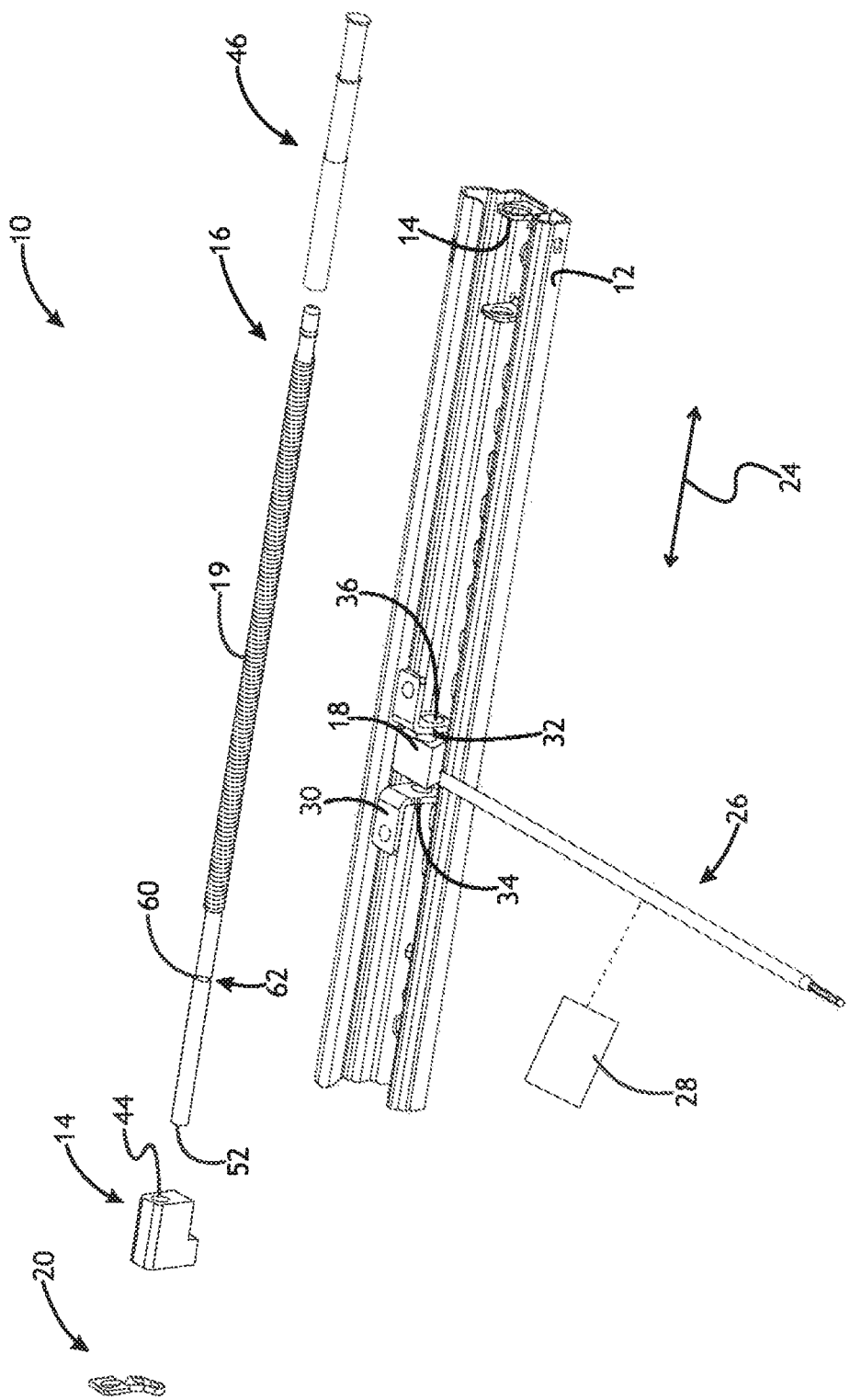
FIG. 1 is an exploded perspective view of a portion of a release and slide assembly for a vehicle seat.

Referring in more detail to the drawings, FIG. 1 illustrates a portion of a vehicle seat mounting assembly 10 including a seat track 12, a mount 14 coupled to the track 12, a lead screw 16 parallel to the track 12, a drive nut 18 movable on the lead screw 16 and coupled to the bracket, and a retainer 20 coupled to the mount 14 and the seat track 12 or vehicle. As diagrammatically shown in FIG. 6, a vehicle seat 22 is mounted to the mounting assembly for movement relative to the seat track 12. Two complementary mounting assemblies may be used, and they may be spaced apart and parallel, and mirror images of each other to support laterally opposed sides of the seat (e.g. one side facing a driver side or left side of the vehicle and the other side facing the passenger side door or right ride of the vehicle). Because the assemblies 10 may be identical, only one assembly will be described herein unless both assemblies or components of both assemblies are specifically mentioned.

The seat track 12 may extend in a fore-aft direction (e.g. aligned in a direction between a front and rear of the vehicle) depicted by arrow 24. The seat track 12 is fixed to a floor of the vehicle or other stationary support structure. The lead screw 16 is coupled to the track 12 by front and rear mounts 14 that may be fixed to the track 12, or vehicle floor, such as by bolts or other fasteners. The drive nut 18 is rotatably received on threads 19 on the lead screw 16 for fore-aft movement along the lead screw 16, and is rotated by a drive shaft 26 that extends in a cross-car direction (e.g. direction between driver and passenger sides of the vehicle, which may be referred to as left and right sides of the vehicle, which extend between the front and rear of the vehicle). The drive shaft 26 is coupled to both drive nut 18s 18 of the seat, that is, the drive nut 18 in each of the two seat tracks 12. Rotation of the drive shaft 26, such as by a motor 28, rotates both drive nut 18 and moves the drive nut 18 along its respective lead screw 16 to move the seat 22 fore and aft along the track 12.

The drive nut 18 may be coupled to or operably associated with a bracket 30 or other connector that moves with the drive nut 18. The bracket 30 may have first and second walls 32, 34 that may have voids 36 through which the lead screw 16 extends. The drive nut 18 is received between the walls 32, 34, and the walls 32, 34 are engaged by the drive nut 18 as it rotates and moves axially along the lead screw 16, where axially refers to the axis of rotation 38 of the drive nut 18 and the center axis of the lead screw 16. In other words, the first wall 32 is engaged by the drive nut 18 to displace the bracket 30 in a first direction relative to the seat track 12 when the drive nut 18 is rotated in a first direction, and the second wall 34 is engaged by the drive nut 18 to displace the bracket 30 in a second direction relative to the seat track 12 when the drive nut 18 is rotated in a second direction. As shown in FIGS. 2 and 3, the bracket 30 may be coupled to a slide 40 that, via bearings may be coupled to a support 42 that may be fixed to the seat track 12 or other structure, guides axial/fore-aft movement of the slide 40 and bracket 30 relative to the seat track 12 and support 42.

So arranged, when the seat actuator (which may be include the electric motor 28) is activated, the drive shaft 26 is rotated, which rotates the drive nut 18 in one of two axial directions corresponding to a desired direction of seat movement. Rotation of the drive nut 18 axially displaces the drive nut 18 relative to the lead screw 16, and the drive nut 18 drives the bracket 30 and slide 40 relative to the support 42, and thereby moves the seat 22 relative to the seat track 12. The speed of seat movement is generally controlled by the rate of rotation of the drive nut 18, and the pitch of the drive nut 18 and lead screw 16 threads.

In some situations it may be desirable to move the seat 22 a considerable distance, such as fully or nearly fully forward to increase the open space behind the seat 22. This makes it easier for a passenger to get into or out of a rear seat (e.g. a seat behind the seat 22), or to place a larger object in the rear seat. At least when the seat 22 is relatively far from the full forward position, it can take an undesirably long time to move the seat 22 to the desired forward position via the powered actuator 28 and drive nut 18.

As shown in FIGS. 2-8, at least a portion of the lead screw 16 is movable relative to the seat track 12. In more detail, the retainer 20 is selectively coupled to or engaged with the lead screw 16. In a first position or first state, the retainer 20 prevents movement of at least part of the lead screw 16 relative to the seat track 12 and in a second position or second state, at least part of the lead screw 16 can move relative to the seat track 12. In at least some implementations, the retainer 20 is associated with the rearward one of the two mounts 14 that couple the lead screw 16 to the seat track 12, and the corresponding rearward end of the lead screw 16 is movable relative to the mount 14 and retainer 20 when the retainer 20 is released (i.e. in its second state). In at least some implementations, at least one of the mounts 14 includes an opening 44, such as a passage or channel, in which the lead screw 16 is received and within which the lead screw 16 may slide 40 when the retainer 20 permits such movement. Both mounts 14 may include an opening 44 (e.g. passage, channel or other) and the lead screw may slidably move relative to both mounts, and a retainer 20 may also be provided on both mount 14, if desired. Or, as shown in FIGS. 2, 6 and 7, the lead screw 16 may be carried by or coupled to a tubular sleeve 46 that is fixed to one of the mount 14, and the lead screw 16 may move axially relative to the sleeve 46. In at least some implementations, the lead screw 16 is coaxially received within the sleeve 46 and slidable relative to the sleeve 46. The sleeve in this implementation may define part of the mount 14 in that the sleeve is fixed to the mount, and the sleeve may define an axially extended opening/passage 44 to support the lead screw 16 over the full range of motion of the lead screw.

Figure 4:
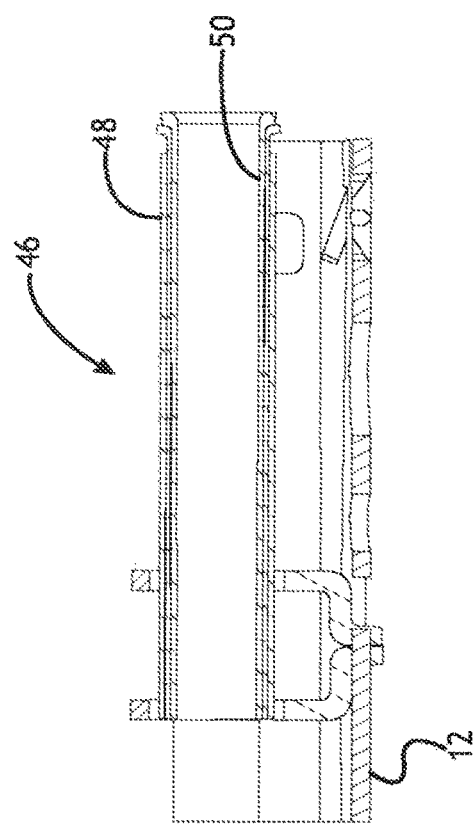
FIG. 4 is a fragmentary sectional view of a telescoping sleeve in a retracted position.
Figure 5:
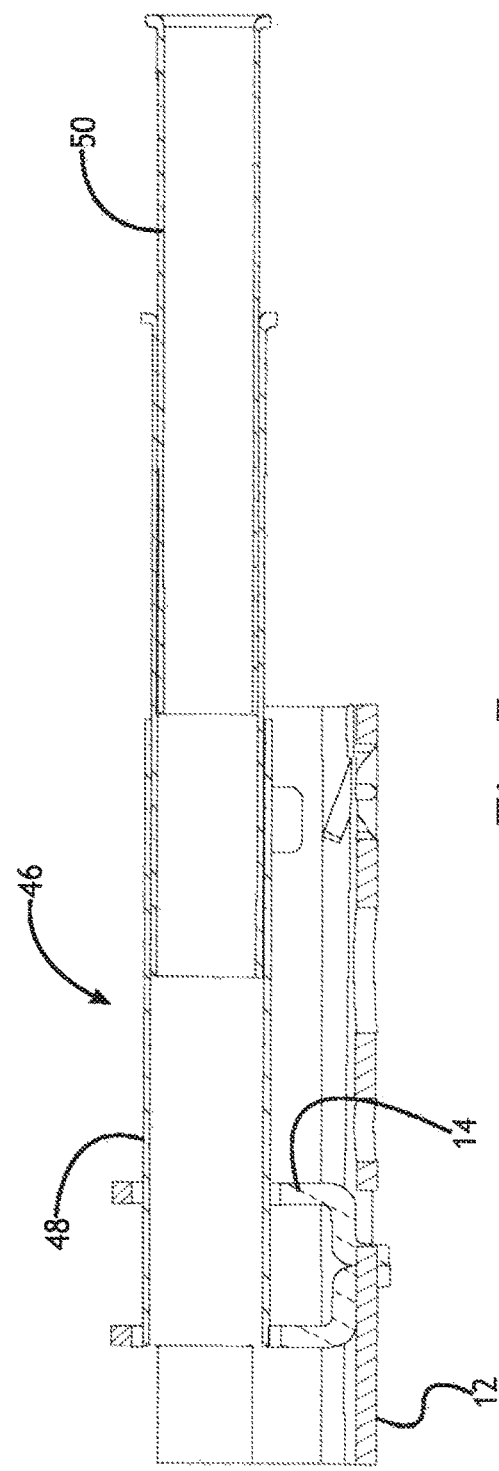
FIG. 5 is a fragmentary sectional view showing the sleeve in an extended position.

The sleeve 46 may have a single section or it may have multiple sections with a first section optionally fixed to the mount 14 (or otherwise coupled to the mount 14 to prevent or inhibit disengagement from the mount 14) and one or more other sections slidable relative to the first section. For example, FIGS. 4 and 5, show a sleeve 46' that has first and second sections 48, 50 wherein the first section 48 is fixed to the mount and the second section 50 is telescopically carried by and slidable relative to the first section 48. FIG. 4 shows a retracted state of the sleeve 46' and FIG. 5 shows an extended state of the sleeve 46'. The lead screw 16 may be fixed to the second section 50 and may slidably move relative to the first section 48 and the mount 14. Of course, more than two sections may be used, if desired. One or all of the sections may be considered to be part of the lead screw and may move relative to the mount 14 with the lead screw.

Whether formed in one piece of material or multiple pieces coupled together (e.g. connected with a sleeve, at least part of which may define part of the lead screw), the lead screw 16 may have an axial length that is greater than the distance between the mounts 14, at least in an extended position of the lead screw 16 (e.g. when the lead screw 16 is extended relative to a sleeve, or when one or more telescopic sections are extended). If one or both mounts 14 include an axial extension, like a sleeve fixed thereto, then the distance is measured between the end(s) of such extension(s), that is the distance between the mounts wherein the lead screw is not supported by the mounts.

As best shown in FIG. 6, in at least some implementations, the rearward mount 14 may be received between the ends of the lead screw 16. That is, in at least a first position of the lead screw 16 in which the retainer 20 is engaged with the lead screw 16 and the lead screw is not released to slide relative to the seat track 12, the rear end 52 of the lead screw 16 may be located outboard of (i.e. not between) the mounts 14. When the retainer 20 is moved to its second state, at least a portion of the lead screw 16 may move relative to the mounts 14 (e.g. an end may remain fixed to a mount 14 when a sleeve, or other telescopic or other extendable arrangement is used). This can be seen by comparison of FIGS. 6 and 7, which show the lead screw 16 in its first or normal operating position, with FIG. 8, which shows the lead screw 16 in a released and slidably displaced position associated with the seat 22 being slid forward in the vehicle. When the lead screw 16 moves, the drive nut 18, bracket 30 and slide 40, and hence the seat 22, move with the lead screw 16. During the movement of the lead screw, the drive nut 18 remains threadedly engaged with the lead screw 16, and in position on the lead screw 16 and relative to the bracket 30 and slide 40.

To permit subsequent operation and use of the seat 22, the seat 22 is moved back to or sufficiently toward its normal operating position, and the retainer 20 may move or be moved back to its first state to lock the lead screw 16 against movement, as is described in more detail below. Thus, the lead screw 16 is again coupled to and not movable relative to the seat track 12 to permit normal operation of the powered or power assisted seat movement as described above. A biasing member 54 may be coupled to the lead screw 16 to yieldably bias the sleeve 46 and provide or assist a desired movement of the sleeve 46 and seat when the retainer 20 is released. A second biasing member 55, as shown in FIGS. 6-8, may act in the opposite direction to facilitate rearward movement of the sleeve 46.

Figure 9:
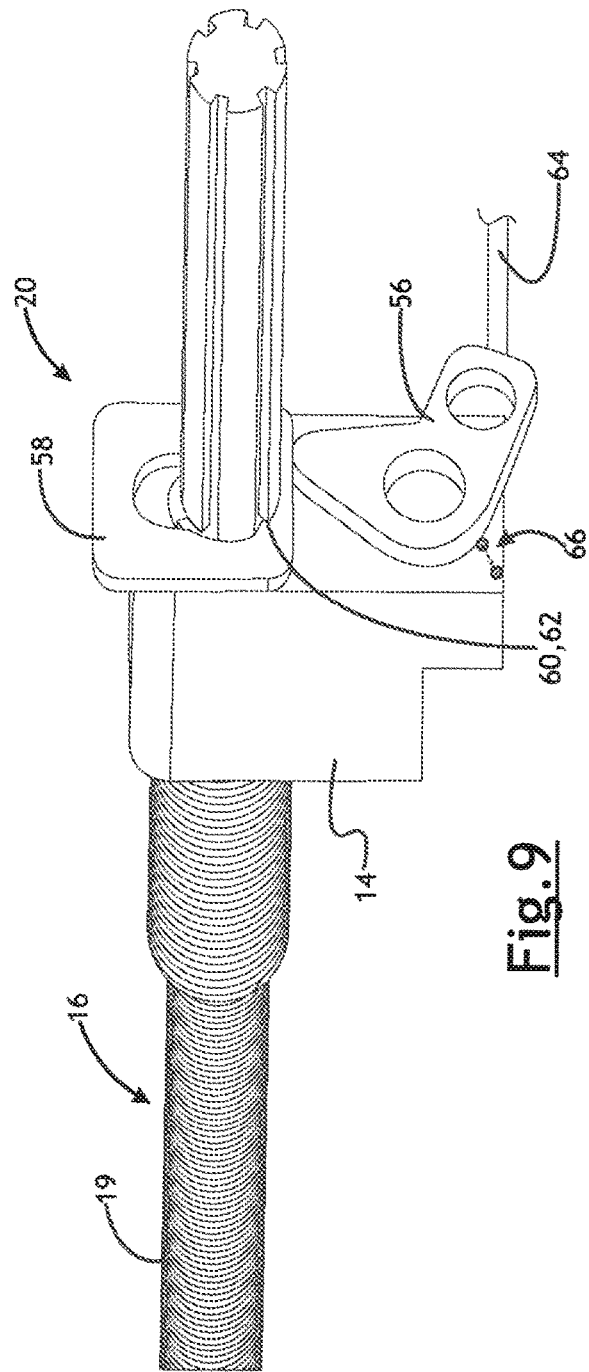
FIG. 9 is a fragmentary perspective view showing an end of the lead screw, a mount and a retainer, with the retainer in its first position.
Figure 10:
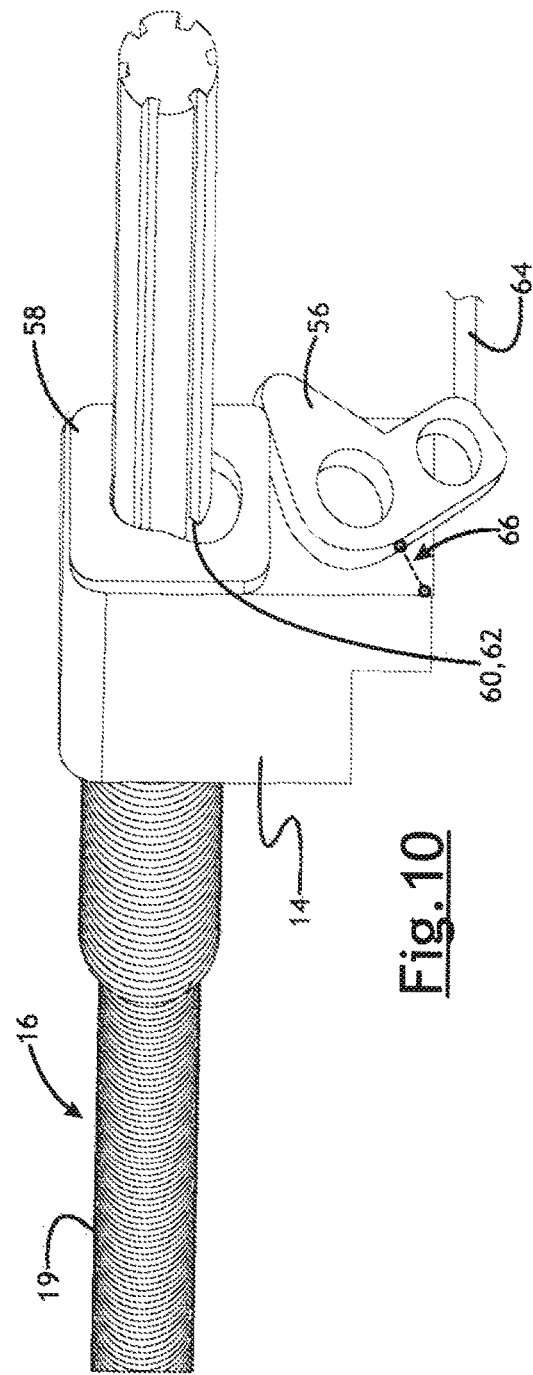
FIG. 10 is similar to FIG. 9 and shows the retainer in its second position.

To facilitate returning the seat 22 to the first or normal operating position/state, the retainer 20 may automatically return to its first state when the seat 22 is moved back to the position it was in before the lead screw 16 was released. This may be accomplished in many ways. For example, as shown in FIGS. 9-10, the retainer 20 may include a drive member 56 movably coupled to the mount 14 or another structure, and a lock member 58 movably coupled to the mount 14 or another structure for movement relative to the lead screw 16. The drive member 56 may be yieldably biased to its first position which is shown in FIG. 9. In its first position, the drive member 56 engages and slidably moves the lock member 58 against the force of gravity so that the lock member 58 engages and prevents movement of the lead screw 16. In at least some implementations, the lead screw 16 includes at least one stop surface 60 that is defined at least in part by a radially extending void 62 (e.g. a slot or notch) and the lock member 58 is pushed into the void 62 by the drive member 56. The void 62 may define two axially opposed stop surfaces 60 and the lock member 58 may be received between the stop surfaces 60 to prevent movement of the lead screw 16 in either axial direction when the lock member 58 is in its first position.

The drive member 56 may be coupled to an actuator 64, for example a cable that may be connected to a release mechanism, such as a lever or button. When the release mechanism is actuated, the actuator moves the drive member 56 to its second position, which is shown in FIG. 10. In this position, the lock member 58 is permitted to move relative to the lead screw 16, such as under the force of gravity or a biasing member like a spring, so that the lock member 58 is no longer in the void of the lead screw 16 and does not radially overlap/block the lead screw 16. In this position, the lead screw 16 may move relative to the lock member 58 as described above. When the release mechanism is not actuated, the drive member 56 may return toward its first position under force (e.g. force provided from the cable 64 or a biasing member 66 acting on the drive member), and the drive member 56 thus displaces the lock member 58 relative to the lead screw 16. However, with the lead screw 16 void 62 no longer aligned with the lock member 58, the lock member 58 merely engages by does not prevent slidable movement of the lead screw 16. The lever or cable 64 may be actuated by a person (e.g. a person moving a lever or depressing a button) or it may occur automatically as a result of some other action. For example, pivoting a seat back 68 (labelled in FIG. 6) forward relative to a seat bottom 70 (also labelled in FIG. 6) may actuate the retainer to simplify user interaction with the seat 22 and release mechanism.

When the lead screw 16 is moved back to its starting position (e.g. the position before it was moved relative to the lock member 58), the void 62 will become aligned with the lock member 58 which, under force of gravity or force of the biasing member 66 acting on the drive member 56, will move into the void 62 to once again overlap the stop surface(s) 60 and block movement of the lead screw 16. Hence, the retainer 20 may automatically reset to its first state to block movement of the lead screw 16 relative to the mounts 14 and seat track 12. Or, the retainer 20 could be manually moved to its first state (e.g. by the cable or other mechanism) if desired.

Figure 12:
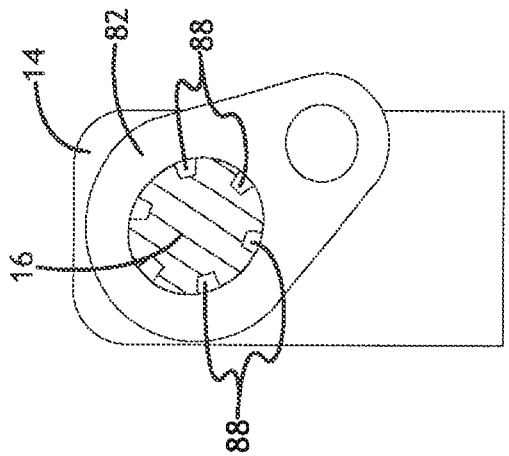
FIG. 12 is an end view of the assembly shown in FIG. 11.
Figure 11:
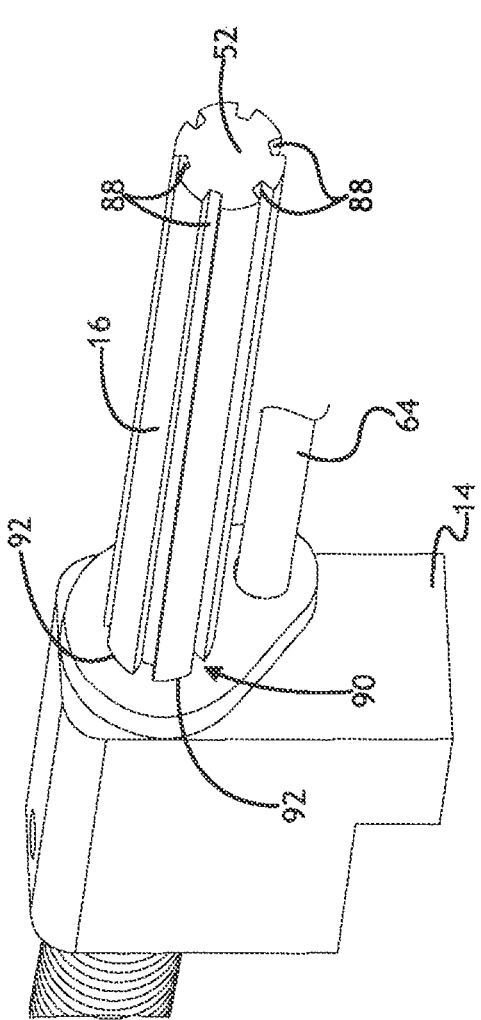
FIG. 11 is a fragmentary perspective view showing an end of a lead screw, a mount and a retainer, with the retainer shown in its first position.
Figure 13:
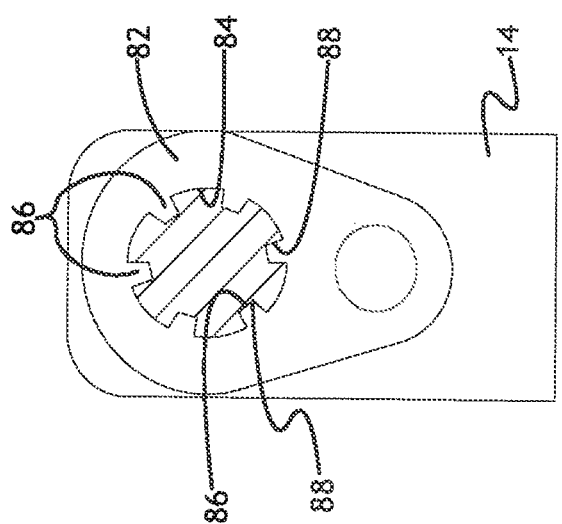
FIG. 13 is an end view of the assembly showing the retainer in its second position.

A retainer 80 shown in FIGS. 11-13 includes a lock member 82 that, in a first position, engages and prevents relative movement of the lead screw 16 and, in a second position, permits movement of the lead screw 16 relative to the lock member 82 and mount 14. In this example of a retainer 80, the lock member 82 includes a passage 84 having a discontinuous or not constant diameter, and which may include one or more inwardly extending tabs 86. In the example shown, multiple tabs 86 are provided spaced circumferentially apart and are arranged to be received in axially extending slots 88 in the lead screw 16. The lead screw 16 includes a radially oriented void 90 (e.g. slot or notch) spaced from an end of the lead screw 16 and extending radially inwardly to the axially extending slots 88. The void 90 defines spaced apart, axially opposed stop surfaces 92 defined by the lead screw 16 outboard of the axial slots 88.

In the first position of the retainer 80, the lock member 82 is received in the void 90 and rotationally oriented or positioned so that the tabs 86 are circumferentially or rotationally not aligned with the axial slots 88 in the lead screw 16. Hence, the tabs 86 are radially overlapped by the stop surfaces 92 and axial movement of the lead screw 16 relative to the lock member 82 is prevented. In the second position of the retainer 80, the lock member 82 is rotated so that the tabs 86 are aligned with and received in the axial slots 88 of the lead screw 16, and the lead screw 16 may slidably move relative to the lock member 82. The lock member 82 may be yieldably biased toward its first position, and when the lead screw 16 is returned to its starting position, the void 90 is aligned with the lock member 82 which may then rotate back to its first position wherein the tabs 86 are not aligned with the slots 88. In this position, the lock member 82 again prevents slidable movement of the lead screw 16. The lock member 82 may be directly connected to an actuator 64, such as a cable or lever actuated by a person or upon movement of the seat back 68 (by way of non-limiting examples), without a separate drive member as in the embodiment shown in FIGS. 9 and 10.

Figure 15:
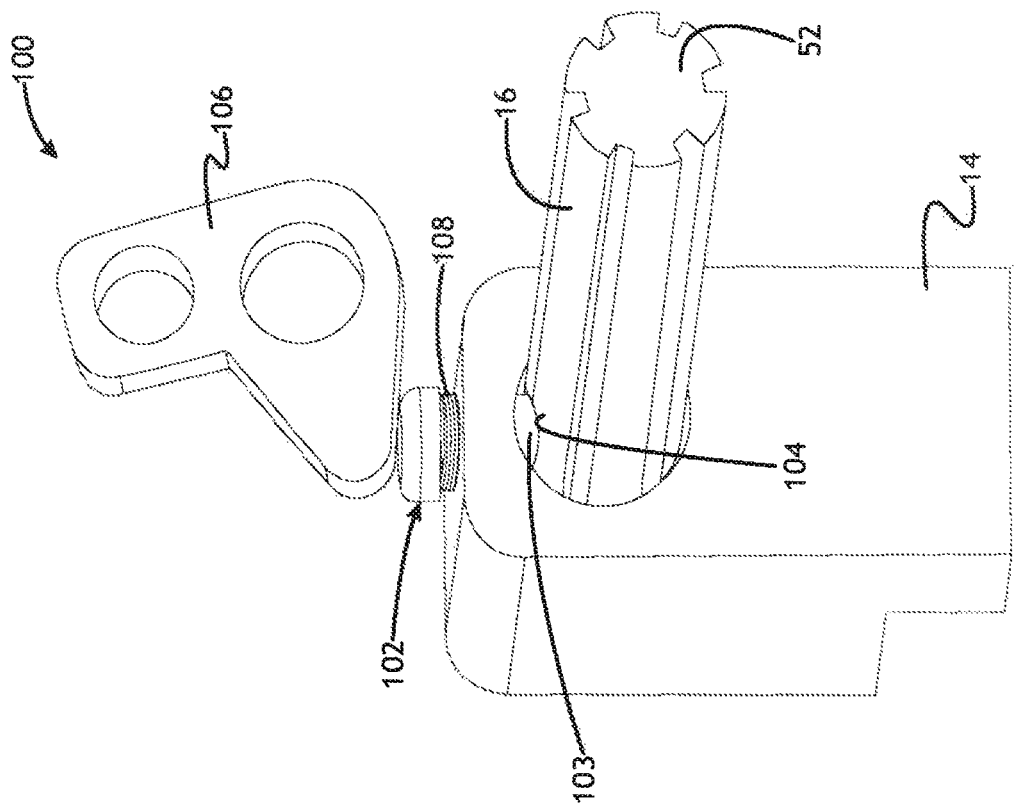
FIG. 15 is similar to FIG. 14 and shows the retainer in its second position.
Figure 14:
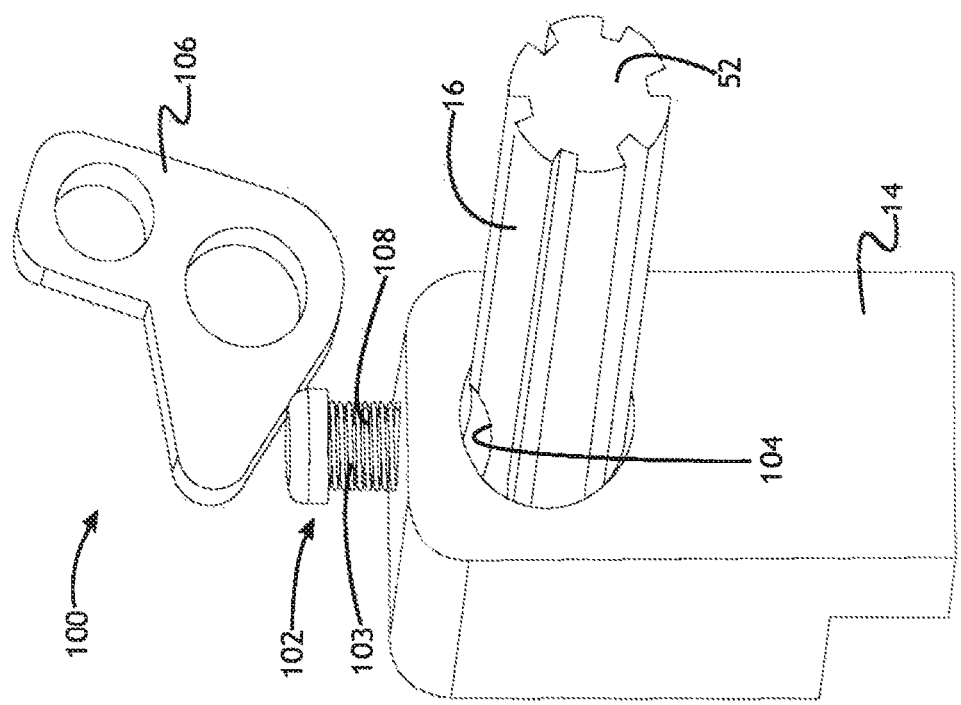
FIG. 14 is a fragmentary perspective view showing an end of a lead screw, a mount and a retainer, with the retainer shown in its first position.

Another retainer 100 is shown in FIGS. 14 and 15. This retainer 100 includes a lock member 102 that moves radially relative to the lead screw 16 which includes a radially inwardly extending void 104 (e.g. a hole or slot). The lock member 102 may be a plunger that may be driven by a drive member 106 that is in turn driven by an actuator 64, such as a cable or lever as described above, or the lock member 102 may be directly driven by the actuator 64 without any drive member 106. In the first position, shown in FIG. 15, the drive member 106 forces the lock member 102 radially inwardly and positions a stem 103 of the lock member 102 into the void 104 in the lead screw 16. Movement of the lead screw 16 is then blocked by the lock member 102. In the second position, the lock member stem 103 is removed from or not in the void 104 and the lead screw 16 may be slidably moved. A biasing member, such as a spring 108 may bias the lock member 102 toward its second position so that when not acted on by the drive member 106 (or actuator 64), the lock member 102 tends to move toward its second position. The drive member 106 may be biased toward its first position, and the force on the drive member 106 may be greater than the force on the lock member 102, if desired. Thus, when the drive member 106 is not acted on by the actuator 64, the drive member 106 tends to move to its first position and the drive member 106 acts on the lock member 102. When the void 104 is aligned with the lock member 102, the lock member 102 will then be moved to its second position to prevent movement of the lead screw 16. Alternatively, the lock member 102 may be coupled to or part of the drive member 106 so that the lock member 102 is pulled out of the void 104 when the actuator 64 moves the drive member 106, and the lock member 102 moves with the drive member 106 back toward the first position when the actuator 64 is not forcing the drive member 106 to its second position. Of course, other arrangements may be used.

Accordingly, the powered seat adjustment/seat moving system may be disconnected from the seat 22 to permit movement of the seat 22 without actuation of the powered actuator 28. Further, the disconnection occurs between the lead screw and the seat support structure, and does not require disconnection of the drive nut from the lead screw, or disconnection of the drive shaft from the drive nuts. Thus, the system can be relatively simple and facilitate reconnection of the powered seat adjustment system when the seat is returned to its starting position. While primarily described above as providing a fast and convenient mechanism for forward sliding of a vehicle seat, the assemblies described herein could be used to permit disconnection of the seat from the powered adjustment system to facilitate movement of the seat in the opposition direction, such as may be desirable to provide additional space, for example, to enable easier ingress/egress of a driver relative to the seat.

What is claimed is:

1. An assembly for a vehicle seat, comprising:
   a seat track including a mount;
   a lead screw carried by the mount;
   a drive nut threadedly engaged with the lead screw and rotatable relative to the lead screw about an axis, the drive nut moves in a first axial direction along the lead screw when the drive nut is rotated about the axis in first direction and the drive nut moves in a second axial direction along the lead screw when the drive nut is rotated in a second direction;
   a slide coupled to the drive nut for movement with the drive nut; and
   a retainer having a lock member that is movable relative to the lead screw, the lock member has a first position in which the lock member engages and prevents axial movement of at least part of the lead screw and a second position in which the lock member permits axial movement of at least part of the lead screw, wherein the lead screw includes or is coupled to at least one telescopic section to permit the length of the lead screw to change as at least part of the lead screw moves relative to the mount.

2. The assembly of claim 1 which also includes a second mount and wherein the two mounts are spaced apart, and wherein the lead screw has an extended state in which the lead screw has a first length and a retracted state in which the lead screw has a second length that is less than the first length, and wherein the first length is greater than the distance between the mounts.

3. The assembly of claim 1 wherein the retainer includes a drive member that moves the lock member between the first position and second position of the lock member.

4. The assembly of claim 1 which also includes a seat coupled to the slide so that the seat moves with the slide relative to the seat track.

5. The assembly of claim 1 wherein the mount is fixed to the seat track.

6. The assembly of claim 5 wherein the retainer is connected to the mount.

7. The assembly of claim 1 wherein the slide is coupled to the drive nut by a power transmission member including a bracket having a first wall and a second wall, and wherein the drive nut is received between the first wall and the second wall.

8. An assembly for a vehicle seat, comprising:
   a seat track including a mount;
   a lead screw carried by the mount;
   a drive nut threadedly engaged with the lead screw and rotatable relative to the lead screw about an axis, the drive nut moves in a first axial direction along the lead screw when the drive nut is rotated about the axis in first direction and the drive nut moves in a second axial direction along the lead screw when the drive nut is rotated in a second direction;
   a slide coupled to the drive nut for movement with the drive nut; and
   a retainer having a lock member that is movable relative to the lead screw, the lock member has a first position in which the lock member engages and prevents axial movement of at least part of the lead screw and a second position in which the lock member permits axial movement of at least part of the lead screw, and wherein the lead screw is movable relative to the mount and has an extended position in which part of the lead screw extends beyond the mount, wherein the lead screw includes or is coupled to at least one telescopic section to permit the length of the lead screw to change as at least part of the lead screw moves relative to the mount.

* * * * *